INVENTOR
GEORGE F. McLANE
BY David Teschner
ATTORNEY

AFTER ALL RESET TIMES

OUTPUT SENSE LINES

AFTER INHIBIT A TIME

AFTER INHIBIT B TIME

AFTER INHIBIT A & B TIME

United States Patent Office 3,243,599
Patented Mar. 29, 1966

3,243,599

MULTI-APERTURE PLATE HALF ADDER

George F. McLane, Philadelphia, Pa., assignor to Sperry Rand Corporation, New York, N.Y., a corporation of Delaware Filed July 26, 1962, Ser. No. 212,555
7 Claims. (Cl. 307—88)

Figure 1:
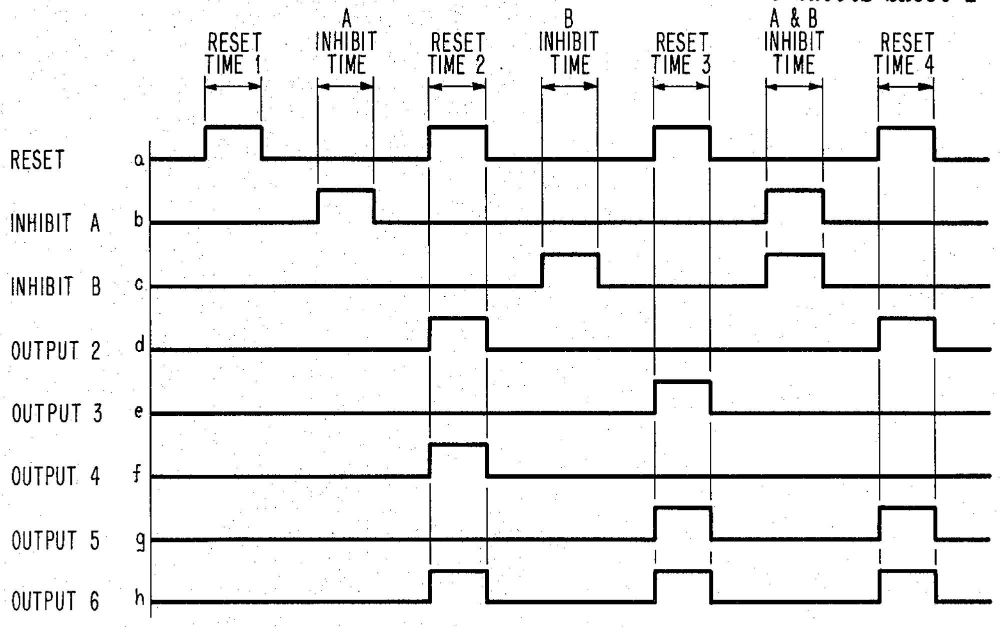

This invention relates to logical devices employing magnetic materials and more particularly to a multi-aperture core half adder.

Ferro-magnetic or simply magnetic materials have gained wide use in the information handling field because of their capability of being magnetized to saturation in either of two directions. These materials exhibit a so-called rectangular hysteresis characteristic which assures that after the core has been saturated in either direction, a definite point of magnetic remanence representing the residual flux density in the core will be retained for either of these two directions. These two points of magnetic remanence are the two stable conditions in the core which can be used to represent, for example, storage of binary information, i.e., one remanent state to represent a "1" and the other to represent a "0."

The most widely used of these magnetic material devices is the well-known torodial core. Extreme reliability, stability, and ease of maintenance have led to its wide use in magnetic memory matrices, delay lines, and logic circuits. In some of these applications, large numbers of cores, windings, diodes, matching transformers, and capacitors must be employed to insure that only the required switching currents or voltages are applied to selected cores and to prevent the application of undesired back currents and voltages caused by the desired switching. The employment of such devices has increased the cost, decreased the switching times and increased greatly the power requirements.

One solution to the problems set forth above is the use of more complex magnetic structures which perform the functions formerly requiring a plurality of simpler toroidal cores. These more complex structures, because of their physical properties permit the establishment of various flux paths within their boundaries, thus eliminating many external transfer loops, diodes and condensers presently employed to transfer inputs and outputs among the various individual cores. These structures can be fabricated so as to produce certain preset or prearranged logical functions, thus eliminating, to a large measure, additional components external to the magnetic structure itself. This approach, however, would have the disadvantage of requiring a different magnetic structure for each desired logical function desired to be performed. A simpler, more economical approach would be to use a single form of magnetic structure which could be employed to perform a great number of logical functions by the mere expedient of placing particular winding configurations upon the magnetic structure. This permits the production of a single form of structure which is both economical and easy to employ.

The logical half-adder is a device which may conveniently be constructed employing the complex magnetic structure approach. As is well known in the computing and data processing arts, a logical half-adder is a device which is capable of receiving two inputs and producing either a sum or carry output therefrom. Table I fully describes the manner of operation of this device.

*Table I*

| Inputs | | Outputs | |
|---|---|---|---|
| A | B | Sum | Carry |
| 0 | 0 | 0 | 0 |
| 0 | 1 | 1 | 0 |
| 1 | 0 | 1 | 0 |
| 1 | 1 | 0 | 1 |

$$S=A\overline{B}+\overline{A}B$$
$$C=AB$$

The table indicates the possibility of inputs on two lines A and B and shows outputs designated as the sum and the carry. It can be seen from the table that upon the occurrence of inputs of the A and B lines on zero and zero, respectively, no output or a zero output will be available on both the sum and the carry output lines. In the condition where a one is present on either of the input lines A or B an output is available on the sum output line whereas a zero or no output is available on the carry output line. The last line in the table shows that if there are inputs present on the lines A and B at the same time, a zero or no output will be available on the sum output line whereas a one output will be available on the carry output line. The operation set forth in the table is fully described in the logical equations placed below it. For example, the sum is described by the logical equation which states that if A and not B is present (i.e., meaning that A is present and B is absent) or A is absent and B is present, a sum output will be produced. The carry is described by the second equation and indicates that a carry output will be obtained only upon the concurrence of inputs on the A and B lines. The usual manner of constructing a device to provide signals in accordance with the operation set forth in the table is to provide a logical "And" circuit, a circuit which provides an output only upon the concurrence of both or all of its input signals, to provide the carry output indicated by the carry equation in the last line of the table. Further a logical "Exclusive Or" circuit is provided to produce the sum output indicated by the equation under the conditions of zero on one of the lines and one on the other. The definition of the logical "Exclusive Or" circuit is such that it will produce an output when there is input to one and only one of its input lines. The table describing the operation of the logical half adder indicates one of its particular uses, as a comparison device. The output on the carry lines is used to indicate the fact that the two inputs are the same whereas an output on the sum line indicates that the two inputs applied to the device are not the same.

It is therefore an object of this invention to provide a novel form of multi-aperture magnetic plate logic device which overcomes the difficulties of the known core circuit logic devices.

It is another object of this invention to provide a single multi-aperture magnetic plate which may be employed as a logical half adding device.

Still another object of this invention is to provide a multi-aperture magnetic plate which may be used to provide all the necessary logical functions required of a logical half adding device.

Still another object is to provide a multi-aperture magnetic plate which is simple to construct and maintain and which may be used with well-known transistor circuitry.

In practicing this invention, there is provided a multi-aperture magnetic plate having a central aperture and further apertures located on center lines concentric with the central aperture of the device. The apertures are so placed as to result in a plurality of equal-sectional magnetic legs. These legs are threaded in various combinations by reset and inhibit input windings and a plurality of output sense windings. Outputs are produced in the output sense windings according to the change of the flux in the particular leg each is arranged to sense. An output signal is thus available to indicate satisfaction of the logic configuration which the plate represents.

Other objects and features of the invention will be pointed out in the folowing description and claims and illustrated in the accompanying drawings, which disclose, by way of example, the principle of the invention and the best modes which have been contemplated for carrying it out.

Figures 3A, 3B:
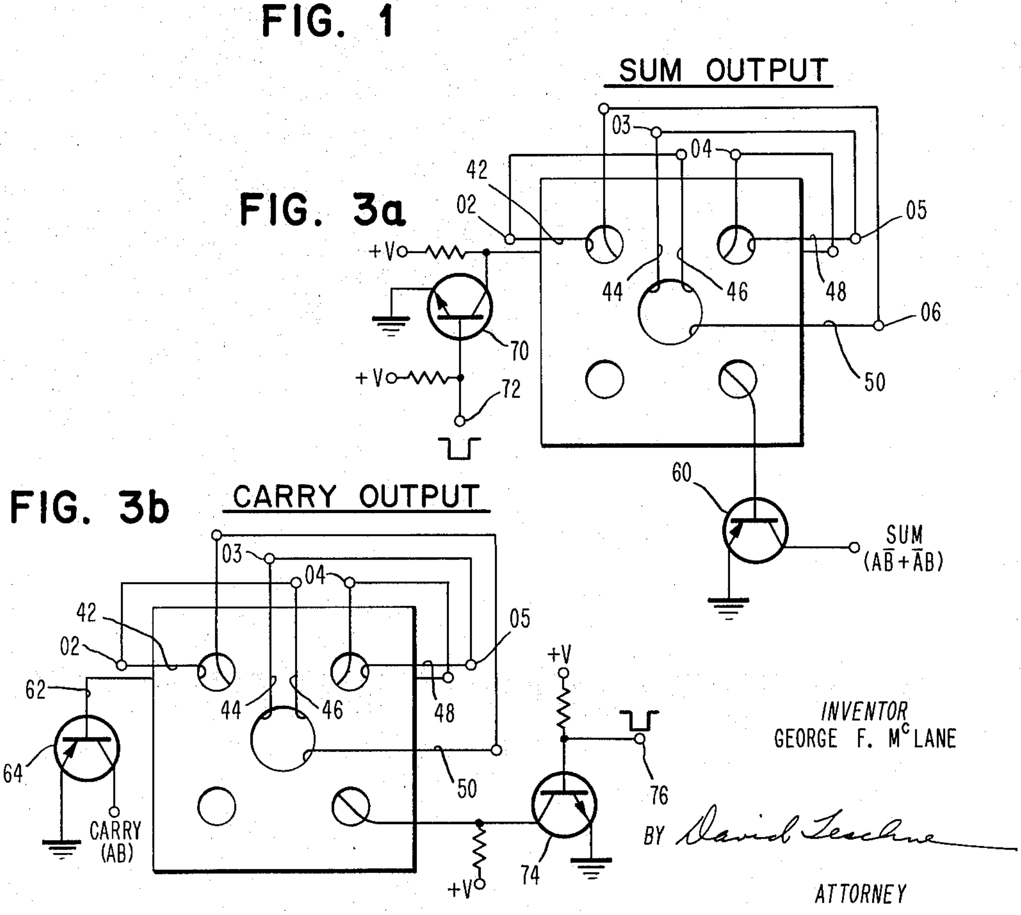

In the drawings:

FIGURE 1, composed of lines *a, b, c, d, e, f, g* and *h* is a timing diagram which illustrates the relative timing of the application of the various input pulses and the output pulses derived thereby;

FIGURE 2, composed of FIGURES 2*a*, 2*b*, 2*c*, 2*d*, 2*e* and 2*f* illustrates the flux patterns within the plate for various input conditions as well as the inhibit input and reset windings;

FIGURE 3, composed of FIGURES 3*a* and 3*b*, shows the manner of organization of the output sense windings to produce the output sum signal and the output carry signal.

Similar reference characters refer to similar parts of each of the several drawings.

Referring now to FIGURE 1, there is shown a timing diagram illustrating the application of the various input pulses to the logical device of the invention, as well as the resulting output pulses from the various output sense windings to be described below. Line *a* illustrates the application of reset current pulses. Line *b* illustrates the application of the inhibit A current pulses whereas line *c* indicates the application of the inhibit B current pulses. Lines *d* through *i* indicate the output sense windings as the result of the application of the various reset and inhibit pulses indicated above. By comparing the time of application of the various pulses, it can be seen:

(1) That reset pulses are applied alternately with other types of pulses.

(2) That inhibit A pulses and inhibit B pulses may be applied individually or in combination at the same time.

(3) Output pulses are only made available during the reset times which follow the application of either or both of the inhibit A or inhibit B pulses.

In addition there are also available negative clock pulses (not shown) which occur in between the respective reset times shown and at the same time as the application of any inhibit pulse. These clock pulses are used for some control functions as described below.

Figure 2A:
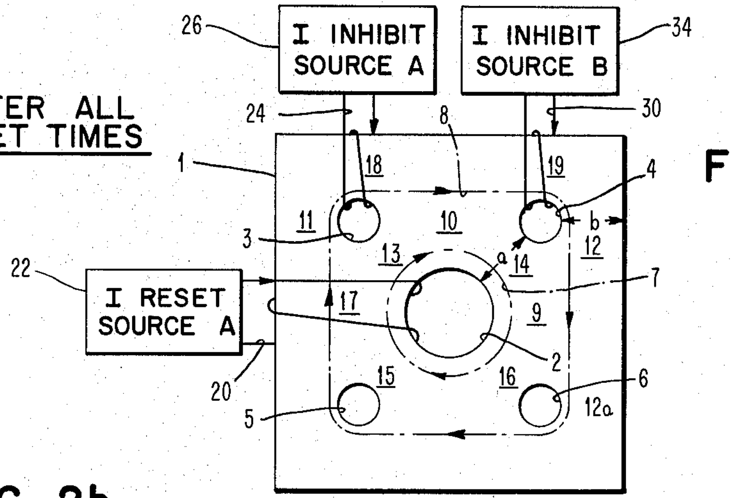

Turning now to FIGURE 2*a*, there is shown the arrangement of the basic device indicating the manner and arrangement of the various reset and inhibit inputs. In the figure there is shown the basic multi-aperture magnetic plate generally designated as 1. This plate contains a central aperture 2 and a plurality of further apertures designated 3, 4, 5, and 6. These further apertures are located with their centers on a circle which is concentric with the central aperture. The diameter of this circle, on which the centers of the further apertures are located as well as the placement of the further apertures on this circle is chosen so that the distances *a* and *b* shown in the figures are equal.

The distance *a* is measured along a radial line from the center point of aperture 2 and specifies the distance along those lines from the perimeter of aperture 2 to the perimeters of apertures 3 to 6. The distance *b* is measured along radial lines from the centers of apertures 3 to 6 to the edge of the plate itself, and specifies the distance from the perimeters of the apertures 3 to 6 to their respective edges. The distance *b* will be considered to describe a circular path concentric with each of the apertures 3 to 6. The effects of the corners do not substantially affect the manner of operation described and are thus neglected. It should be noted in the description that follows that only the additional apertures 3, 4 and 6 are employed in the logical half-adder to be described. The multi-aperture plate could thus be formed without provision for an aperture 5. However, in order that a uniform element be employed most economically, as set out above, a standard form of multi-aperture plate is used. The manner of operation of the device will be the same regardless of the presence or absence of the further aperture 5 for the configuration employed. The placement of these apertures 2 to 6 will cause, under proper input conditions, the establishment of two major flux paths. The first of these paths 7 is concentric with the central aperture and passes inside of the apertures 3, 4, 5 and 6. This path 7 saturates the magnetic legs 13 (between the central aperture and the aperture 3), 14 (between the central aperture and the aperture 4), 15 (between the central aperture and the aperture 5), and 16 (between the central aperture and the aperture 6). The second of these paths 8, is also generally concentric with the center aperture but passes outside of the apertures 3, 4, 5 and 6.

Further magnetic legs are found as follows: leg 9 exists between the apertures 4 and 6; a magnetic leg 10 exists between the apertures 3 and 4; magnetic leg 11 exists between the edge of the plate and the aperture 3; magnetic leg 12 exists between the edge of the plate and the aperture 4 and magnetic leg **12*a* exists between the edge of the plate and the aperture 6. There are in addition, magnetic leg 17 placed between the central aperture 2 and the edge of the plate 1, a magnetic leg 18 located between the aperture 3 and the edge of the plate and lying in a position perpendicular to the magnetic leg 11, and a further magnetic leg 19 existing between the aperture 4 and the edge of the plate and lying in a position perpendicular to the magnetic leg 12**.

A two turn reset winding 20 is placed over the magnetic leg 17 and through the central aperture 2 and is supplied by a source of reset current 22. A two turn winding 24 is placed over the magnetic leg 18 and through the aperture 3, and is supplied with inhibiting current from an inhibiting source 26. The purpose of this winding is to supply the A inhibit or first input condition to the plate. A further two turn winding 30 is placed over the magnetic leg 19 through the aperture 4 and is connected to a source of inhibit current 34. This winding and source are used to supply the B inhibit or second input condition to the plate.

It should be understood that two turn windings are employed for illustrative purposes only and that any combination of turns and current value may be used for the inhibit A and inhibit B inputs as long as the ampere-turns (M.M.F.) applied to each is equal to the other.

Figure 2B:
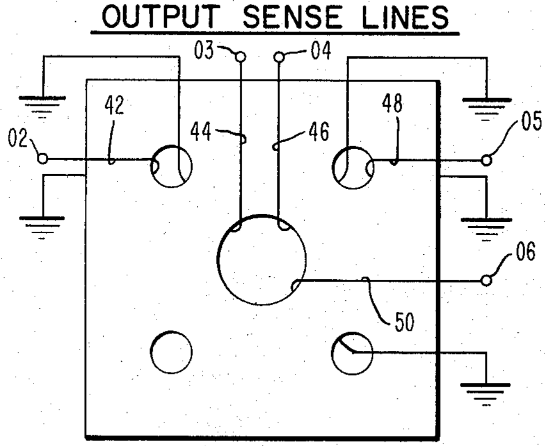

Referring now to FIGURE 2*b*, the manner and arrangement of the output windings for the device are shown. A first output sense winding 42 is found running from ground under the magnetic leg 11 through the aperture 3 back over the magnetic leg 11 to an output terminal designated O2. A second output sense winding designated as 44 is shown to run from ground over the magnetic leg 18 through aperture 3 under magnetic leg 13 through the central aperture 2 and over magnetic leg 10 to a terminal designated O3. A third output winding 46 is found to run from ground over the magnetic leg 19 through the aperture 4 under the magnetic leg 14 through the central aperture 2 over the magnetic leg 10 to an output terminal designated O4. A fourth output sense winding indicated as 48 is connected from ground under the magnetic leg 12 through the aperture 4 back over the magnetic leg 12 to an output terminal designated O5. A fifth and final output sense winding designated 50 is found to run from ground over the magnetic leg 12*a* through the aperture 6 under the magnetic leg 16 through the central aperture 2 and then over the magnetic leg 9 to an output terminal designated O6. While the input lines have been indicated in the FIGURE 2*a* and the output sense lines indicated in the FIGURE 2*b* it should be understood that this was done merely for the purpose of simplifying the illustration and the discussion of the device and that in the actual case both sets of windings are found upon the same plate device.

Figure 2C:
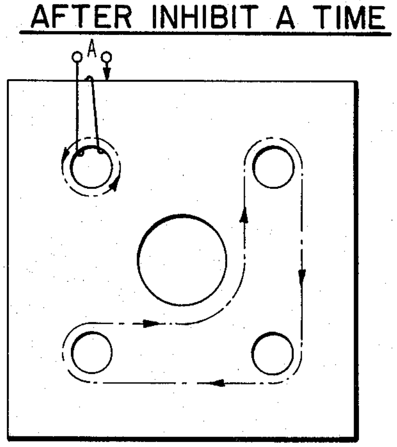

Referring now to FIGURES 2*c* to 2*h* the manner of operation of the device as illustrated in FIGURES 2*a* and 2*b* is now described. Assuming that a reset pulse has been applied by the reset source 22 to the reset winding 20 the flux pattern shown in the FIGURE 2*a* at 7 and 8 is established due to the physical properties of the material and the geometry of the structure. It will be assumed for the purposes of this description that the flux direction indicated by the arrow heads on the paths 7 and 8 are positive and that in leg 9 flux passing from right to left is positive. However, any other convention could be assumed with proper adjustment of the output voltage polarities. Upon the application of the inhibit A pulse to the winding 24, a flux pattern as shown in FIGURE 2*c* is established. It can be seen that an individual flux path is established about the aperture 3 in a counterclockwise direction and that a major loop has been established about the apertures 4, 5 and 6 but wholly outside of the central aperture 2. Upon application of the reset pulse following the removal of the inhibit pulse A the original flux pattern as shown in FIGURE 2*a* is re-established. The following changes of flux and induced voltages are found as a result of this reset operation: the flux through the magnetic leg 11 is reversed in a positive direction resulting in a positive pulse which is derived at the output terminal O2; the flux through the magnetic leg 13 as a result of inhibit pulse A being in the same direction as that caused by the application of the following reset pulse causes no net change in flux resulting in a zero output pulse at the terminal O3; the flux through the magnetic leg 14 is reversed in a positive direction thereby resulting in the generation of a positive output pulse at the terminal O4; the direction of flux passing through the magnetic leg 12 being the same both before and after the application of the reset pulse results in a zero or no output pulse being generated at the output terminal O5; and finally the flux through the magnetic leg 16 is reversed in a positive direction thereby resulting in a positive output pulse generated at the output terminal designated O6. The application of the inhibit A pulse is illustrated on line 16 of FIGURE 1 while the reset pulse is illustrated on line *a*. The resulting output pulses at the terminals O2 through O6 are shown on the lines *d* through *h* and are indicated under the reset time 2.

Figure 2D:
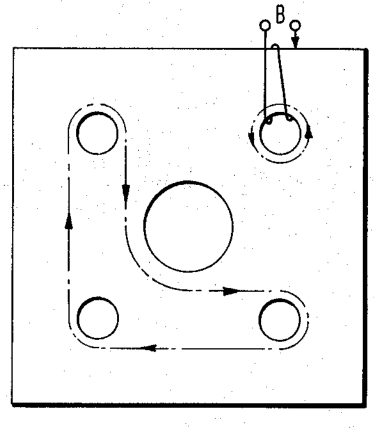

During the following time period the inhibit B pulse is applied to the winding 30 from the source of inhibit current 34. The flux pattern as shown in FIGURE 2*d* results from the application of this pulse. Upon the application of the reset pulse following the removal of the inhibit B pulse during reset time 3 the flux pattern shown in FIGURE 2*a* is re-established. The following changes in the flux and the resulting induced voltages in the output windings are indicated as follows: the flux through the magnetic leg 11 remains the same in its direction before and after the application of the reset pulse 3 and therefore results in the generation of no output pulse at the terminal designated O2; the flux through the magnetic leg 13 is positively reversed in its direction resulting in the generation of a positive output pulse at the output terminal designated O3; the flux through the magnetic leg 14 remains in the same direction after the application of the reset pulse and thus results in a zero output pulse generated at the output terminal O4; the direction of the flux through the magnetic legs 12 and 16 are reversed in a positive direction and result in the generation of positive output pulses at the output terminals designated O5 and O6. The application of the inhibit B and the reset pulse are shown on the lines *c* and *a* of FIGURE 1 respectively, whereas the output pulses at the respective terminals O2 through O6 are shown on the lines *d* through *h* under the reset time.

Figure 2E:
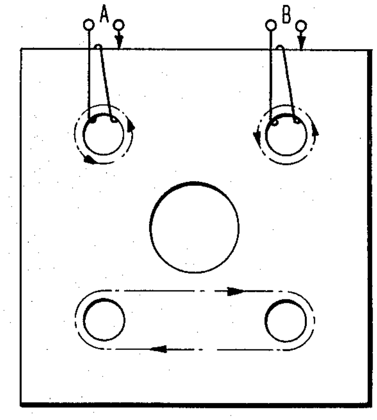

If during the following time period, pulses are applied by both of the inhibit sources A and B that is 26 and 34, respectively, the flux pattern shown in FIGURE 2*e* is established. The reset pulse following the termination of the inhibiting pulses returns the device to its normal condition, that is with flux paths in the directions indicated in the FIGURE 2*a*. This return of the device to its normal condition results in the following flux changes within the device and the resultant induced voltages as indicated below: the flux is reversed in a positive direction in the legs 11, 12 and 16 resulting in positive output pulses being derived at the output terminals O2, O5, and O6; whereas no output voltages are generated at the terminals O3 or O4 due to the fact that the flux remains in the same direction, before and after the reset pulse, in the magnetic legs 13 and 14. The application of the input pulses are as shown on lines *b* and *c* of FIGURE 1 and the application of the reset pulse is shown on line *a*. The output pulses generated at the respective terminals O2 through O6 are found on the lines *d* through *h* under the reset time indicated as 4.

Referring now to FIGURE 3, there is shown an arrangement whereby the various windings indicated in the FIGURE 2*b* are organized to form the logical half adder. In FIGURE 3*a* there is shown the organization of windings which produce an output indicative of the sum value, whereas, the FIGURE 3*b* illustrates the organization of the windings to result in an output indicative of the carry value. In particular the following winding arrangement is found in FIGURE 3*a*: the terminal O2 of the output sense winding 42 is connected to the O4 terminal of the output sense winding 46; the portion of the winding 46 which is shown as being grounded in the FIGURE 2*b* is instead connected to that portion of the winding 48 which is also indicated as grounded in the FIGURE 2*b;* the terminal O5 of the output sense winding 48 is connected to the O3 output terminal of the output sense winding 44 and the portion of winding 44 indicated as grounded in the FIGURE 2*b* is connected to that terminal O6 of the output sense winding 50; the portion of the output sense winding 50 which is indicated as grounded in the FIGURE 2*b* is shown in the FIGURE 3*a* as extending to the base of the PNP transistor 60, the emitter of which is grounded and the collector of which provides the sum output voltage. The end of output winding 42, which is shown directly grounded in FIGURE 2*b,* is in the arrangement of FIGURE 3*a,* connected to the collector of a further transistor 70. This transistor is of the NPN type, arranged in a grounded emitter configuration. The transistor 70, has its base biased positively to permit it to normally conduct thus applying ground to the base of transistor 60. However, when the negative clock pulse is applied to the base terminal 72 during the time any inhibit inputs are introduced, the transistor 70 is turned off. This causes the application of the high positive collector bias to the base of transistor 60. Hence, transistor 60 is prevented from being turned on during a period in which the inhibit inputs may be applied.

As a result of this manner of connecting the output sense windings together, the induced voltages at terminals O2 and O5 are applied in a first direction, whereas the induced voltages at the terminals O3 O4 and O6 are applied in such a manner as to be opposite or buck the induced voltages of the terminals O2 and O5.

To illustrate the manner of operation of the device consider an input being applied to the winding 24 by the inhibit source 26 or the inhibit A pulse. As can be seen from a consideration of line 3 of Table I under these conditions, that is an input to the terminal A and no input to the terminal B, a sum output should be developed by the device. The application of the inhibit A pulse will cause the formation of a flux pattern as shown in the FIGURE 2*c*, and described above. The following reset pulse will cause a restoration of the original flux pattern as shown in the FIGURE 2*a*, as described above, with the following voltages being induced in the respective portions of the output winding circuit of FIGURE 3*a*.

The output on the output terminal O2 will be in a first direction as has been described. The outputs of the terminals designated O4 and O6 will be applied in a direction to buck or opposite to the direction of application of the signal at terminal O2. The outputs of the terminals O3 and O5 being zero do not affect the output signal in any way. Thus on the output conductor to the base of the transistor 60 there appear in effect one unit output signal in a first direction and a two unit output signal in the opposite direction or a net algebraic sum of one unit pulse in the second direction. This pulse is sufficient to bias the base of the PNP transistor 60 negative and thus cause conduction, generating a positive output pulse at the collector of the transistor 60 indicating in effect that a sum digit is present.

Referring now to FIGURE 3*b*, the windings which are joined in order to form the carry output are set forth. The O2 terminal of the output sense winding 42 is connected to the O4 terminal of the output sense winding 46; the normally grounded portion of the output winding 46 as shown in the FIGURE 3*a* is connected to the normally grounded terminal of the output sense winding 48; the terminal O5 of the output sense winding 48 is connected to the O3 terminal of the sense winding 44; and the normally grounded portion of winding 44 is connected to the terminal O6 of the output sense winding 50, the other end of which is attached to the collector of a NPN transistor 74. The transistor 74, has the negative clock pulse applied to its base terminal 76. The manner of operation is similar to that set forth with respect to transistor 70 of FIGURE 3*a*. The normally grounded side of the output sense winding 42 is connected by a conductor 62 to the base of a PNP transistor 64. The output at terminl O1 is not employed. The transistor 64 is connected with its emitter grounded and its collector acting as the output source. As a result of this particular winding arrangement the output signals found at the terminals O2, O3, O4 and O6 are applied to buck or oppose the output signal on the terminal O5.

To illustrate the manner of operation of the carry circuit of the device, the condition where A and B inputs are present is considered. Under this condition inhibit current is applied by the sources 26 and 34 to the windings 24 and 30. As shown by the last line of Table I upon the concurrence of the A and B inputs no output should appear on the sum line but a carry should be found at the carry output line. The introduction of the A and B signals will result first in a flux pattern shown in FIGURE 2*e*, which upon the application of the following reset pulse will return and re-establish the original flux pattern as shown in FIGURE 2*a*, inducing a set of voltages at the output sense windings in accordance with that shown in FIGURES 2*d* to 2*h*. As signal in a second direction will be available at the output terminals O2 and O6 whereas no signal will be available at the terminals O3 and O4 and a signal in a first direction will be available at the terminal designated O5. The set effect of these output signals is to place a value equal to one unit signal in the second direction upon the output line 62 to the carry transistor 64. As in the case with the sum transistor 60 the algebraic value of the signals applied, will cause the transistor to conduct and apply the positive output pulse indicating the presence of a carry. It should be understood that although the sum and carry circuits have been indicated separately in the respective drawings 3*a* and 3*b* these are in actual practice wound upon the same core and provide outputs to the respective transistors such as 60 and 64.

It should be noted that no consideration has been given of the first condition indicated in the Table I that being inputs of zero on both the A and the B input lines. This is due to the fact that the absence of any signal on these two lines will result in no flux change during the period of the supposed application of signals and thus will result in no flux change during the following reset time. Thus there will be no discernable indication of an input condition. This arrangement permits distinguishing between the conditions of a one on the two inputs and the condition of a zero on both.

Figure 2F:
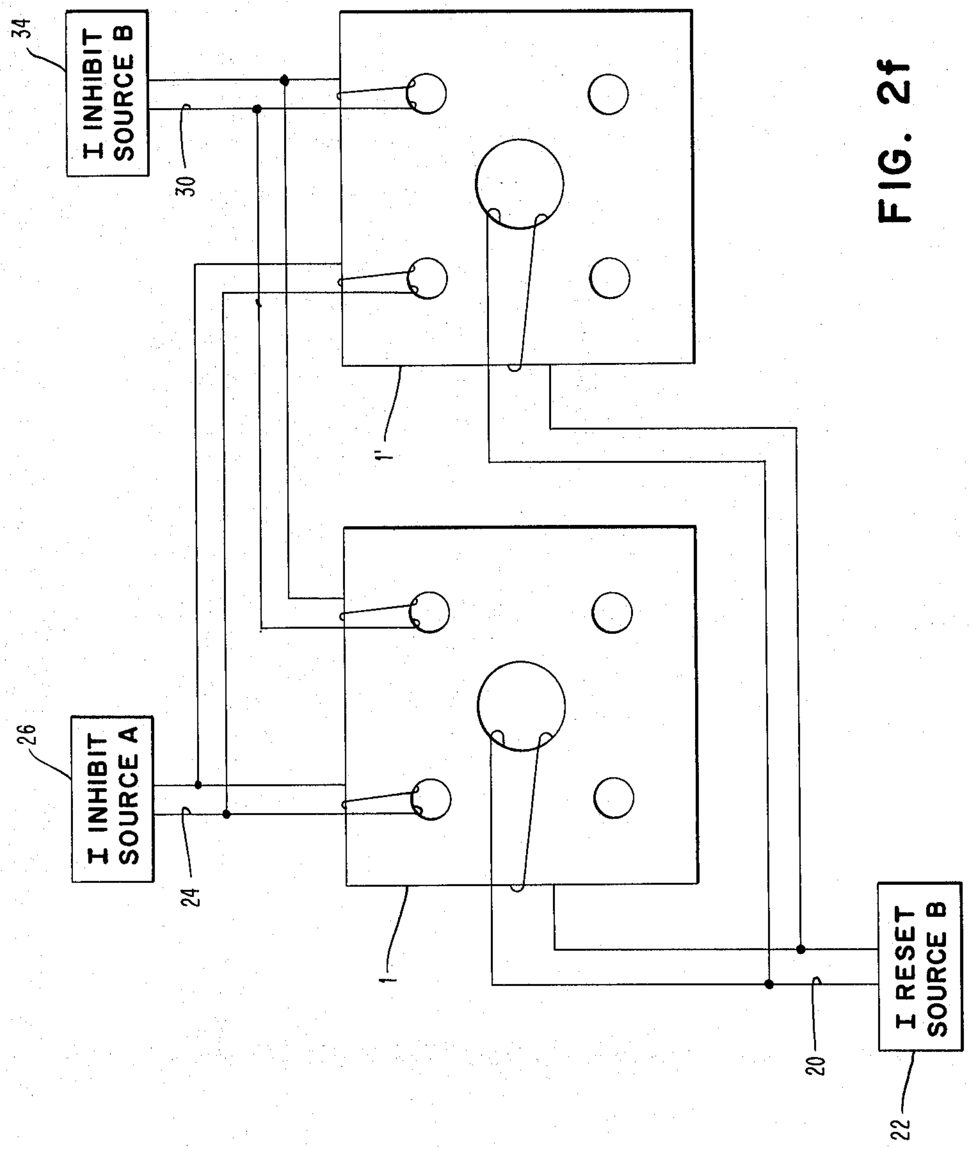

It should be quite evident that although this device has been discussed with reference to a single core with both sets of windings placed upon it the circuit could equally well operate employing two separate multi-aperture plate devices each containing the separate windings required for the sum and the second for the carry outputs. The input windings required for a two-plate system are shown in FIGURE 2*f*. Further it might be possible to completely eliminate the carry windings and carry output devices entirely. As stated above no output would result from inputs of zero and zero, so in effect the table is reduced to two possible conditions, one in which the inputs are dissimilar, that is, A and B are either one or zero but not the same and the second condition wherein the inputs A and B are each one, in other words, the same. In the first condition a one will be detected at the sum output whereas in the second indication no output will be detected at the sum output. Hence, upon the receipt of a pulse at the sum terminal it could be immediately told that there are present one and only one of the two possible input signals and thus that a sum is actually generated. However, if a zero was present at the sum output terminal or a not sum signal then it could be determined immediately that both inputs A and B were present and thus that in actuality there was a carry signal. Thus the signal present on the sum would be interpreted as a sum whereas the absence of a signal on the sum would be interpreted as a carry signal. The same could be done with the carry output terminal if that were employed in the place of both a sum and a carry terminal. In this instance a zero on the carry line would indicate that a sum value was present whereas a one on the carry line would indicate that the actual carry was present.

While there have been shown and described and pointed out the fundamental novel features of the invention as applied to the preferred embodiments, it will be understood that various omissions and substitutions and changes of the form and details of the devices illustrated and in its operation may be made by those skilled in the art, without departing from the spirit of the invention.

The embodiments of the invention in which an exclusive property or privilege is claimed are defined as follows:

1. In a logical half-adder, a logical "AND" gate formed from a first multi-aperture plate, said first plate having a central aperture and a plurality of further apertures so placed as to provide a plurality of magnetic legs, said first plate further being capable of remaining in either of two magnetic remanent states; first and second input windings inductively coupled to selected ones of said magnetic legs for establishing remanent magnetic states in accordance with the presence or absence of signals upon said input windings; a plurality of output windings inductively coupled to selected ones of said magnetic legs and connected in a series manner for detecting the change in flux in said selected legs as a result of the application of signals to said input windings; a logical "exclusive OR" gate formed from a second multi-aperture plate and a plurality of further apertures so placed as to provide a plurality of magnetic legs, said second plate further being capable of remaining in either of two magnetic remanent states; third and fourth input windings inductively coupled to selected ones of said magnetic legs of said "exclusive OR" gate for establishing remanent magnetic states in accordance with the presence or absence of signals upon said third or fourth input windings; a plurality of output windings inductively coupled to selected ones of said magnetic legs of said "exclusive OR" gate and connected in a series manner for detecting changes in flux in said selected legs as a result of the application of signals to said input windings of said "exclusive OR" gate, first means connected to said first and third input windings for providing signals indicative of a first quantity and second means connected to said second and fourth input windings for providing signals indicative of a second quantity.

2. A logical half-adder, comprising an "AND" gate formed from a first multi-aperture plate, said first plate having a central aperture and a plurality of further apertures arranged with their centers on a line concentric with said central aperture, said center line, being so chosen as to place said further apertures an equal distance from said central aperture and the edge of said first plate, thus providing a plurality of magnetic legs, said first plate further being capable of remaining in either of two magnetic remanent states; a first input winding, inductively coupled through said central aperture to establish a flux pattern in said first plate; second and third input windings, each inductively coupled through separate ones of said further apertures to alter the flux pattern in selected ones of said magnetic legs; a plurality of output windings connected in series and inductively coupled to selected magnetic legs to detect changes in flux in said selected magnetic legs, an output being available at the terminals of said output windings in response to signals being impressed upon both of said second and said third input windings; an "exclusive OR" gate formed from a second single multi-aperture plate, said second plate having a central aperture and a plurality of further apertures arranged on a center line concentric with said central apertures and equally spaced upon said center line to provide a plurality of magnetic legs; a fourth input winding inductively coupled through said central apertures to establish a flux pattern in said plate; fifth and sixth input windings, each inductively coupled through separate ones of said further apertures of said "exclusive OR" gate to alter the flux pattern in selected ones of said magnetic legs of said "exclusive OR" gate; a plurality of output windings connected in series and inductively coupled to selected magnetic legs to detect changes in flux in said selected magnetic legs of said "exclusive OR" gate, an output being available at the terminals of said output windings in response to signals being impressed upon either of said fifth or sixth input windings but not both; first means connected to said second and fifth input windings for providing signals indicative of a first quantity and second means connected to said third and sixth input windings for providing signals indicative of a second quantity.

3. A logical half-adder comprising an "AND" gate and an "exclusive OR" gate, each of said gates being constructed from first and second multi-aperture plates, each said plate having a central aperture and a plurality of further apertures, arranged with their centers on a line concentric with said central aperture, said center line being so chosen as to place said further apertures an equal distance from said central aperture and the edge of said plate thus providing a plurality of magnetic legs of equal width, said respective plates further being capable of remaining in either of two magnetic remanent states; a first input winding upon each said plate, inductively coupled to selected magnetic legs and threaded through said central apertures to establish a flux pattern in each of said first and second plates; second and third input windings upon each said plate, inductively coupled to certain magnetic legs and threaded through said further apertures to alter the flux patterns in said plates; a first source to supply signals to said second input windings on each of said first and second plates indicative of the presence or absence of a first operand; a second source to supply signals to said third input windings on each of said plates indicative of the presence or absence of a second operand; a plurality of output windings inductively coupled to selected magnetic legs, and connected in a series group to provide at its terminal an output indicative of the change of flux in said plate, one output winding group for each said first and second plates; and means, one connected to each of said output windings groups to detect changes in the flux in its associated winding group, a first of said means providing an output when both said first and said second quantities are present representing a logical carry value and a second of said means providing an output when either of said first or second quantities are present but not both representing a logical sum value.

4. A logical half adder comprising an "AND" gate and an "exclusive OR" gate, said gates employing a multi-aperture plate, said plate having a central aperture and a plurality of further apertures, arranged with their centers on a line concentric with said central aperture, said center line being so chosen as to place said further apertures an equal distance from said central aperture and the edge of said plate thus providing a plurality of magnetic legs of equal width, said plate further being capable of remaining in either of two magnetic remanent states; an input winding inductively coupled to selected magnetic legs and threaded through said central aperture to establish a flux pattern within said plate; a plurality of further input windings inductively coupled to certain of said magnetic legs and threaded through said further apertures for altering the flux in selected magnetic legs; and a plurality of output windings connected in series and inductively coupled to selected magnetic legs for detecting the change of flux in said selected magnetic legs.

5. A logical half-adder comprising an "AND" gate and an "exclusive OR" gate, each of said gates being constructed upon a single multi-aperture plate, said plate having a central aperture and a plurality of further apertures, arranged with their centers on a line concentric with said central aperture, said center line being so chosen as to place said further apertures an equal distance from said central aperture and the edge of said plate thus providing a plurality of magnetic legs of equal width, said plate further being capable of remaining in either of two magnetic remanent states; a first input winding inductively coupled to certain of said magnetic legs and threaded through said central aperture for establishing a first flux pattern in said plate; a second input winding inductively coupled to a single magnetic leg and threaded through one of said further apertures; means connected to said second input winding to supply signals indicative of the presence or absence of a first operand, to thereby cause the flux pattern within the plate to be altered when said first quantity signals are present; a third input winding inductively coupled to a different single magnetic leg and threaded through a different one of said further apertures, means connected to said third input winding to supply signals indicative of the presence or absence of a second operand to thereby cause the flux pattern within the plate to be altered when said second quantity signals are present; a first output winding inductively coupled to selected magnetic legs to sense the change in flux in those legs due to the concurrent application of signals indicative of the presence of both said first and second operands and representative of a logical carry; and a second output winding inductively coupled to selected magnetic legs to sense the change in flux in those legs due to the application of signals indicative of the presence of either said first operand or said second operand, but not both and representative of a logical sum.

6. In a logical half-adder, a logical "AND" gate formed from a first multi-aperture plate, said first plate having a central aperture and a plurality of further apertures arranged with their centers on a line concentric with said central aperture, said center line being so chosen as to place said further apertures an equal distance from said central aperture and the edge of said first plate thus providing a plurality of equal cross-section magnetic legs, said first plate further being capable of remaining in either of two magnetic remanent states; first and second input windings inductively coupled to selected ones of said magnetic legs for establishing remanent magnetic states in accordance with the presence or absence of signals upon said input windings; a first input means connected to said first input winding for providing signals indicative of a first operand; a second input means connected to said second input winding for providing signals indicative of a second operand; a plurality of output windings inductively coupled to selected ones of said magnetic legs and connected in a series manner to produce a first output signal at its output terminals indicative of the net change of flux in said windings, said output signal being present when signals from said first and second input means are present, and absent when signals are not present from said first and second input means; a logical "exclusive OR" gate formed from a second multi-aperture plate, said second plate having a central aperture and a plurality of further apertures arranged with their centers on a line concentric with said central aperture, said center line being so chosen as to place said further apertures an equal distance from said central aperture and the edge of said second plate thus providing a plurality of equal cross-section magnetic legs, said second plate further being capable of remaining in either of two magnetic remanent states; third and fourth input windings inductively coupled to selected ones of said magnetic legs for establishing remanent magnetic states in accordance with the presence or absence of signals upon said input windings, said third input winding being connected to said first input means and said fourth input winding being connected to said second input means; a plurality of output windings inductively coupled to selected ones of said magnetic legs and connected in a series manner to produce a second output signal at its output terminals indicative of the net change of flux in said windings, said output signal being present when signals from either said first or second input means is present but not both, said signal being absent when signals from both said first and second input means are present; said second output signal representing the sum of said first and second operands, and said first output signal representing the carry resulting from the combination of said first and second operands.

7. A logical half-adder, comprising an "AND" gate formed from a first multi-aperture plate, said first plate having a central aperture and a plurality of further apertures arranged with their centers on a line concentric with said central aperture, said center line being so chosen as to place said further apertures an equal distance from said central aperture and the edge of said first plate thus providing a plurality of equal cross section magnetic legs, said first plate further being capable of remaining in either of two magnetic remanent states; a first input winding, inductively coupled through said central aperture to establish a flux pattern in said first plate; second and third input windings, each inductively coupled through separate ones of said further apertures to alter the flux pattern in selected ones of said magnetic legs; a first input means connected to said second input winding for providing signals indicative of a first operand; a second input means connected to said third input winding for providing signals indicative of a second operand; a plurality of output windings inductively coupled to selected ones of said magnetic legs and connected in a series manner to produce a first output signal at its output terminals indicative of the net change of flux in said winding, said output signal being present when signals from said first and second input means are present and absent when signals are not present from said first and second input means; an "exclusive OR" gate formed from a second multi-aperture and a plurality of further apertures arranged with their centers on a line concentric with said central aperture, said center line being so chosen as to place said further apertures an equal distance from said central aperture and the edge of said second plate thus providing a plurality of equal cross-section magnetic legs, said second plate further being capable of remaining in either of two magnetic remanent states; a fourth input winding, inductively coupled through said central aperture to establish a flux pattern in said plate, fifth and sixth input windings, each inductively coupled through separate ones of said further apertures to alter the flux pattern in selected ones of said magnetic legs, said fifth input winding being connected to said first input means and said sixth input winding being connected to said second input means; a plurality of output windings inductively coupled to selected ones of said magnetic legs and connected in a series manner to produce a second output signal at its output terminals indicative of the net change of flux in said windings, said output signal being present when signals from either said first or second input means is present but not both, said signal being absent when signals from both said first and second input means are present; said second output signal representing the sum of said first and second operands, and said first output signal representing the carry resulting from the combination of said first and second operands.

References Cited by the Examiner

UNITED STATES PATENTS

| | | | |
|---|---|---|---|
| 2,966,663 | 12/1960 | Leblais | 307—88 X |
| 3,085,232 | 4/1963 | Lamy | 307—88 X |
| 3,126,530 | 3/1964 | Post et al. | 340—174 |

IRVING L. SRAGOW, *Primary Examiner.*

H. D. VOLK, *Assistant Examiner.*